United States Patent
Swinfen et al.

(10) Patent No.: US 9,659,464 B2
(45) Date of Patent: May 23, 2017

(54) USER TERMINAL SYSTEM AND METHOD

(75) Inventors: Richard Swinfen, Angus (GB); Ralph Hasselgren, Fife (GB)

(73) Assignee: I-DESIGN MULTI MEDIA LIMITED, Dundee (GB)

( * ) Notice: Subject to any disclaimer, the term of this patent is extended or adjusted under 35 U.S.C. 154(b) by 992 days.

(21) Appl. No.: 13/322,281

(22) PCT Filed: May 28, 2010

(86) PCT No.: PCT/GB2010/001055
§ 371 (c)(1),
(2), (4) Date: Jan. 26, 2012

(87) PCT Pub. No.: WO2010/136767
PCT Pub. Date: Dec. 2, 2010

(65) Prior Publication Data
US 2012/0117577 A1  May 10, 2012

(30) Foreign Application Priority Data

May 29, 2009 (GB) .................................. 0909277.6

(51) Int. Cl.
*G07F 19/00* (2006.01)
*G06Q 30/02* (2012.01)

(52) U.S. Cl.
CPC .............. *G07F 19/20* (2013.01); *G06Q 30/02* (2013.01); *G07F 19/211* (2013.01)

(58) Field of Classification Search
CPC ........ G07F 19/20; G07F 19/211; G06Q 30/02
USPC ...................................................... 719/328
See application file for complete search history.

(56) References Cited

U.S. PATENT DOCUMENTS

| 7,080,036 B1 | 7/2006 | Drummond et al. |
| 7,494,053 B1 | 2/2009 | Burns |
| 8,185,940 B2 * | 5/2012 | Bowers .................. G06F 21/31 |
| | | 705/50 |
| 2002/0073032 A1 | 6/2002 | Holmes et al. |
| 2002/0138433 A1 | 9/2002 | Black et al. |
| 2005/0131822 A1 | 6/2005 | Gardner |
| 2008/0158150 A1 | 7/2008 | Rossman et al. |
| 2009/0026258 A1 | 1/2009 | Shepley et al. |
| 2009/0032579 A1 | 2/2009 | Gardner |
| 2009/0123026 A1 * | 5/2009 | Rhoads ........................ 382/100 |

FOREIGN PATENT DOCUMENTS

| EP | 1801761 A1 | 6/2007 |
| EP | 2124204 A2 | 11/2009 |
| GB | 2337139 A | 11/1999 |
| WO | WO98/40826 | 9/1998 |

* cited by examiner

*Primary Examiner* — H S Sough
*Assistant Examiner* — Kimberly Jordan
(74) *Attorney, Agent, or Firm* — Moore & Van Allen PLLC; W. Kevin Ransom

(57) ABSTRACT

A monitoring system for a user terminal, wherein the user terminal comprises at least one application for controlling a user transaction or interaction process of the user terminal, the user transaction or interaction process comprising providing content data to a hardware device of the user terminal and outputting the content data to the user by the hardware device, and the monitoring system comprises monitoring means for monitoring the content data and determining a state of the user transaction or interaction process from the content data.

21 Claims, 6 Drawing Sheets

USER TERMINAL SYSTEM AND METHOD

CROSS-REFERENCE TO RELATED APPLICATIONS

This application is filed under the provisions of 35 U.S.C. §371 and claims the benefit of International Patent Application No. PCT/GB2010/001055, filed on May 28, 2010, entitled "A USER TERMINAL SYSTEM AND METHOD", which is hereby incorporated by reference herein in its entirety.

FIELD OF THE INVENTION

The present invention relates to a control system and method for a user terminal, such as a self-service terminal, for example an ATM.

BACKGROUND TO THE INVENTION

User terminals, for example self-service terminals such as ATMs, are very widely used for a variety of purposes. Large financial institutions, such as banks, typically maintain networks of many thousands of ATMs. The ATMs in a particular network, or maintained by a particular organisation, may include a variety of different types or models and a range of different ages and functionalities, are often produced by different manufacturers, and may have different software or operating systems installed.

The diversity of ATMs makes maintenance of ATMs and the production of new software for such ATMs difficult. For example, it may be necessary to produce many different versions of a new ATM application to ensure that it is compatible with each of the different types of ATM in a network. Such difficulties are becoming particularly acute as there has been a move towards providing additional functions or services via ATMs, for example mobile phone top-up services, which require the installation of additional, often sophisticated, applications.

The CEN/XFS standard architecture was developed in order to ensure software compatibility across different ATMs. The CEN/XFS architecture provides a common API layer, also referred to as a service provide layer, that comprises API or service provider modules that provide for communication with and control of hardware devices (for example a keypad, an audio output, or a receipt printer) included in the ATM.

Each hardware manufacture provides service provider modules that include XFS-compliant software, for example dynamically linked libraries (DLLs) that enable communication with and control of hardware devices produced by that manufacturer. Each service provider module provides for a minimum level of commands for associated hardware devices as defined by the CEN/XFS standard.

In operation XFS-compliant applications in the application layer of the ATM send XFS-compliant commands to the appropriate service provider modules in the service provider layer, which can convert the commands to the appropriate hardware-specific format if necessary, and pass the commands on to the appropriate hardware device driver. Similarly, data can be received from hardware devices by the service provider modules and forwarded to the appropriate application in the application in the XFS-compliant format. By using standard XFS commands an application can, in principle, communicate with any installed hardware device if an XFS service provider module is provided for the hardware device.

Each ATM can include service provider modules for different hardware manufacturers (for example NCR, Diebold and Wincor Nixdorf) and hardware devices. The service provider modules that are to be used in a particular ATM are defined by keys stored in a registry of the ATM processing system. The ATM can include an XFS management layer in addition to the service provider layer, which directs commands or other messages to the appropriate service provider module based on the registry keys.

Although the CEN/XFS architecture improves the compatibility of ATM software across different hardware platforms, it is directed to only standard ATM functions. More sophisticated applications directed to more complex ATM functions are not supported under the XFS architecture. Furthermore, the CEN/XFS architecture does not provide for simultaneous access to hardware devices by more than one application, and even serial access to the same hardware device by different applications can cause system crashes. Such system crashes may be avoided by synchronisation of the applications at the application layer, but that is not straightforward, requires modification to the applications and does not allow for addition or replacement of applications.

It is an aim of the present invention to provide an improved, or at least alternative, processing system and method for a user terminal.

SUMMARY OF THE INVENTION

In a first independent aspect of the invention there is provided a monitoring system for a user terminal, wherein the user terminal comprises at least one application for controlling a user transaction or interaction process of the user terminal, the user transaction or interaction process comprising providing content data to a hardware device of the user terminal and outputting the content data to the user by the hardware device, and the monitoring system comprises monitoring means (for example, a further application, an application module or an API) for monitoring the content data and determining a state of the user transaction or interaction process from the content data.

Thus, the state of the user terminal may be determined without requiring modification of the at least one application or interference with the operation of the at least one application.

The content data may comprise display data comprising pixel data items representative of pixels to be displayed on the display device, at least one of the pixel data items comprises an identifier identifying a display screen represented by the display data, and the monitoring means is configured to read said at least one of the pixel data items and determine the state of the user transaction or interaction process from a value of said at least one pixel data item.

The identifier may be encoded on the value of the said at least one pixel data item, for example on a colour component value of said at least one pixel data item.

Said at least one pixel data item may comprise at least one pixel data item representative of a predetermined number of pixels, wherein the predetermined number of pixels is optionally less than or equal to at least one of 10, 6, and 4.

The identifier may be included in pixel data items representative of pixels for display at or near a predetermined location on the display of the display device, wherein optionally the predetermined location comprises an edge or corner of the display.

The monitoring means may be configured to select the at least one pixel data item from the plurality of pixel data items and to monitor the selected at least one pixel data item.

The monitoring means may be configured to monitor the content data before, after or during output by the hardware device. The monitoring means may be configured to intercept the output data between the at least one application and the hardware device, or to obtain the output data from the at least one application, from an operating system or from the hardware device.

The system may further comprise means for rendering the content data for output by the at least one hardware device, and the monitoring of the content data by the monitoring means may comprise monitoring the rendered content data.

The state of the user terminal may comprise a state of the at least one process.

The system may further comprise content providing means for providing content to a user that is alternative or additional to any content provided to a user in the at least one process. The alternative content may comprise a modification of the content provided to the user in the at least one process. The content providing means may comprise one or more of a further application, an application module, a data store and/or an API.

The content providing means may be configured to synchronise the provision of alternative or additional content with the at least one process. The content providing means may be configured to provide the alternative or additional content during at least one predetermined state of the at least one process.

The monitoring means may be configured to determine whether the determined state of the user transaction or interaction process matches a predetermined state, and the content providing means is configured to provide the additional or alternative content in response to the determined state matching the predetermined state.

The content providing means may be configured to provide the additional or alternative content in response to detection of a predetermined one of the display screens of the sequence of display screens, and optionally to replace or overlay the predetermined one of the display screens with the additional or alternative content.

The content providing means may be configured to wait for a predetermined delay period before providing the additional or alternative content.

The content data may comprise identification data and the monitoring means may be configured to read the identification data and to determine the state of the user terminal from the identification data. The content data may comprise display data for display on a display device.

The identification data may comprise an identifier identifying a display screen represented by the display data. The content data may comprise at least one screen file. The identification data may comprise a code. The code may comprise an encoded ASCII string.

The display data may comprise pixel data items representative of pixels to be displayed on the display device, and the identification data may comprise selected pixel data items representative of a plurality of the pixels. The identification data may be encoded on the values of the selected pixel data items.

The system may further comprise means for modifying the content data to be provided to the at least one hardware device data to include the identification data.

The system may further comprise a data store for storing the content data, wherein the modifying means may be configured to modify content data stored in the data store and to store the modified content data in the data store for subsequent retrieval and output.

The content data may comprise at least one display screen file comprising pixel data items, and the modifying means may be configured to modify at least one of the pixel data items to include the identifier.

The monitoring means may be arranged to monitor the content data and to determine a state of the user transaction or interaction process without interfering with operation of the application.

The monitoring means and/or the content providing means may comprise, or forms part of, a further application installed on the user terminal separate from the control application.

The monitoring means may be configured to monitor the content data by issuing an API call to a control program, for example a driver or other operating system component, for the hardware device. The monitoring means may be configured to monitor the content data by issuing a Windows API call to an operating system of the user terminal.

In a further independent aspect of the invention there is provided a method of monitoring a user terminal, wherein the user terminal comprises at least one application for controlling a user transaction or interaction process of the user terminal, and the process comprises providing content data for output to a user by at least one hardware device; and the method comprises monitoring the content data and determining a state of the user transaction or interaction process from the content data.

The content data may comprise display data comprising pixel data items representative of pixels to be displayed on the display device, at least one of the pixel data items comprises an identifier identifying a display screen represented by the display data, and the monitoring means is configured to read said at least one of the pixel data items and determine the state of the user transaction or interaction process from a value of said at least one pixel data item. The identifier may be encoded on the value of the said at least one pixel data item, for example on a colour component value of said at least one pixel data item.

The method may comprise selecting the at least one pixel data item from the plurality of pixel data items and to monitor the selected at least one pixel data item. The method may comprise monitoring rendered content data.

The method may further comprise providing content to a user that is additional or alternative to any content provided to a user in the at least one process. The method may comprise synchronising the provision of additional or alternative content with the at least one process. The method may comprise providing the additional or alternative content during at least one predetermined state of the at least one process.

The method may comprise determining whether the determined state of the user transaction or interaction process matches a predetermined state, and the content providing means may be configured to provide the additional or alternative content in response to the determined state matching the predetermined state.

The method may comprise providing the additional or alternative content in response to detection of a predetermined one of the display screens of the sequence of display screens, and optionally replacing or overlaying the predetermined one of the display screens with the additional or alternative content.

The method may comprise waiting for a predetermined delay period before providing the additional or alternative content.

The content data may comprise identification data and the method may comprise reading the identification data and determining the state of the user terminal from the identification data.

The method may further comprise modifying the content data to be provided to the at least one hardware device data, for example modifying the content data to include the identification data. The method may further comprise modifying content data stored in a data store and storing the modified content data in the data store for subsequent retrieval and output. The method may comprise modifying the pixel data items. The method may comprise modifying the values of the pixel data items, for example the colour component values of the pixel data items.

The content data may comprise at least one display screen file comprising pixel data items, and the method may comprise modifying at least one of the pixel data items to include the identifier.

The method may comprise monitoring the content data and determining a state of the user transaction or interaction process without interfering with operation of the application.

The method may comprise monitoring the content data by issuing an API call to a control program, for example a driver or other operating system component, for the hardware device. The method may comprise monitoring the content data by issuing a Windows API call to an operating system of the user terminal.

In another independent aspect of the invention there is provided a monitoring system for a user terminal, comprising at least one application for controlling at least one process of the user terminal, wherein the at least one process comprises providing output data for output by at least one hardware device; and monitoring means for monitoring the output data and determining a state of the user terminal from the output data. The output data may comprise content data for output to a user. The user terminal may comprise a self-service terminal, for example an ATM.

In a further independent aspect of the invention there is provided a method of monitoring a user terminal, wherein the user terminal comprises at least one application for controlling at least one process of the user terminal, and the at least one process comprises providing content data for output to a user by at least one hardware device; and the method comprises monitoring the content data and determining a state of the user terminal from the content data.

In a further independent aspect of the invention there is provided a control system for a self-service terminal, comprising:—at least one application; an application programming interface (API) comprising an interface to a receipt printer device; interception means that is arranged to intercept at least one message sent from the at least one application or the API, wherein the at least one message comprises content and at least one command from the at least one application to a receipt printer device to print the content on a receipt; and means for amending the intercepted message or at least one of the intercepted messages to provide content that is additional or alternative to the content that is included in the at least one intercepted message and for providing the at least one amended message to the receipt printer device for printing of the additional or alternative content.

In another independent aspect of the invention there is provided a method of controlling a self-service terminal that comprises at least one application and an application programming interface (API) comprising an interface to a receipt printer device, wherein the method comprises:— intercepting at least one message sent from the at least one application or the API, wherein the at least one message comprises content and at least one command from the at least one application to a receipt printer device to print the content on a receipt; and amending the intercepted message or at least one of the intercepted messages to provide content that is additional or alternative to the content that is included in the at least one intercepted message and providing the at least one amended message to the receipt printer device.

According to a further independent aspect of the present invention, there is provided a control system for a user terminal comprising at least one application; an application programming interface (API) comprising an interface to at least one hardware device of the user terminal; interception means that is arranged to intercept a message sent from one of the at least one application or the API. The interception means may be arranged to intercept a message sent from one of the at least one application and the API to the other of the at least one application and the API. The user terminal may comprise a self-service terminal, for example an ATM.

Thus, it may be possible to monitor or determine communication between the at least one application and the hardware device, the state of the at least one application or the hardware device, and/or the state of the or a process run by the at least one application or on the hardware device. That can be particularly useful if it is desired to provide additional functionality of the user terminal, for example by operation of a further application, as it may enable operation of the further application or provision of the additional functionality to be co-ordinated with operation of the at least one application or hardware device.

The at least one application may be provided in an application layer, the API may be provided in an API layer, and the interception means may be located on a path between the application layer and the API layer. The at least one application may comprise an ATM application for providing basic functionality of the user terminal.

The at least one hardware device may comprise at least one of a card reader device, a receipt printer, a user input device (for example a keypad device), or a display device.

The interception means may comprise at least one proxy API.

The API may comprise a service provider, for example an XFS service provider.

Said one of the application and the API may be configured to send the message to a destination represented by destination data, and the interception means may be configured to intercept the message by modifying the destination data.

The destination data may comprise an address, path or file name. The destination data may comprise or be represented by at least one setting, and the interception means may be configured to modify the at least one setting. The at least one setting may comprise or be represented by at least one registry entry, and the interception means may be configured to modify the at least one registry entry. Alternatively or additionally the interception means may be configured to intercept the message by placing the destination data at a selected point in a path, for example, a search path. The path may be a search path of an application. The destination data may comprise an address, path or file name of the proxy API. The proxy API may be or include a DLL and the destination data may comprise an address, path or file name of the DLL.

The API may be configured to receive instructions from the at least one application and to provide the instructions to a hardware device.

The intercepted message may comprise a message to a hardware device from the at least one application, and the interception means may be configured to provide the message to the hardware device. Thus, normal functions of the user terminal may be maintained.

The interception means may be configured to provide the intercepted message to the hardware device via the API.

The API may comprise at least one function, and the interception means may be configured to call the or at least one of the functions included in the API. Thus, the proxy API may provide desired functionality in an efficient manner.

The interception means may comprise a link to at least one function in the API. The at least one function may be included in a DLL.

The API may provide an interface to the hardware device via a hardware platform, the hardware platform may be one of a plurality of different types, and the API may be hardware platform type-specific. The hardware platform may comprise at least one device driver.

The message may be compatible with each of the plurality of hardware-platform types.

The interception means may be compatible with each of the plurality of hardware-platform types.

The system may further comprise means for amending the intercepted message and for providing the amended message to the hardware device. The interception means may be configured to provide the amended message to the hardware device. Thus, a process or function of the user terminal may be modified in an efficient manner, without requiring modification of the at least one application.

The intercepted message may comprise at least one command from the at least one application to a hardware device, and the amending means may be configured to amend the at least one command.

The amending means may be configured to amend the message to provide content that is alternative or additional to content that is included in the intercepted message. Thus, alternative or additional content may be provided to a user in an efficient manner, without requiring modification of the at least one application. The amending may include, or be, providing at least one additional command.

Content referred to herein may comprise audio and/or visual data. Content may comprise at least one of text, graphics, moving or still images, music, speech data, or beeps or other audio signals.

The message may comprise at least one command from the at least one application to a receipt printer device to print a receipt, and the amending means may be configured to amend the message to cause the receipt printer device to print alternative or additional content on the receipt. The additional or alternative content may be appended to the receipt. The additional or alternative content may be content that is additional or alternative to the original receipt content. The alternative content may comprise a modification of the original content.

The alternative or additional content may comprise advertising content.

The intercepted message may comprise a message intended for the at least one application and the interception means may be configured to provide the message to the at least one application. Thus, normal operation of the at least one application may be provided.

The message may be a message from the hardware device. The message may be provided to the interception means via the API.

The interception means may be configured to send the intercepted message and/or at least some data included in the intercepted message to at least one additional destination, in addition to the at least one application or API. Thus, the intercepted message and/or data may be stored or subjected to further processing.

The interception means may be configured to provide the intercepted message or data included in the intercepted message to at least one further application. Thus, the at least one further application may be able to co-ordinate with the at least one application and/or with operation of the at least one hardware device. The at least one further application may be able to monitor operation of the at least one application or at least one hardware device, or modify operation of the at least one hardware device, for example without requiring modification of the at least one application.

Data included in the message may comprise card or user data, for example read by a card reader device. Thus, the at least one further application may be able to obtain card or user data without needing to instruct the card reader device itself. Both the at least one application and the at least one further application may be able to obtain card or user data from a single card reading operation. Card data may comprise data that is stored on, or represents a property of a card. User data may comprise data that represents a property of a user or of a user's account. Card data may include at least some user data. User data may comprise, for example, the user's age, sex, employment status, financial status, personal preferences, nationality, address, bank account number, PIN, account holding branch, or any other physical, social or demographic data concerning the user.

The at least one application may be for providing basic functionality of the user terminal, and the at least one further application may be for providing additional functionality.

The at least one further application may be configured to provide a further message to the interception means in dependence on the intercepted message or data included in the intercepted message.

The further message may comprise a modification of the message or an instruction to modify the message.

The further message may comprise a modification of the at least one command included in the message or an instruction to modify the at least one command included in the message.

The at least one application may be configured to control at least one process of the user terminal, and the system may further comprise means for providing content to a user that is alternative or additional to any content provided to a user by the at least one application in the at least one process.

The content providing means may be configured to provide the alternative or additional content to a user in response to receipt of the intercepted message or data included in the intercepted message.

The system may further comprise means for selecting the alternative or additional content in dependence on the intercepted message or data included in the intercepted message.

The data included in the intercepted message may comprise card or user data and the selecting means may be configured to select the alternative or additional content in dependence on the card or user data. Thus the alternative or additional content may be tailored to the user. User-specific advertising or other content may be provided to a user.

The selecting means may be configured to determine at least one property of the user in dependence on the card or user data and to select the content in dependence on the at least one property of the user.

The alternative or additional content may comprise advertising content. The message comprising the user or card data may be intended for the at least one application, and the interception means may be configured to provide the card data to the or a at least one further application.

The content providing means may be configured to provide the alternative or additional content by amendment of the message by the amending means.

The provision of alternative or additional content to the user may comprise printing the alternative or additional material on a receipt or displaying the alternative or additional material on a display device associated with the user terminal. The display device may be included in the user terminal. The interception means may be configured to provide an instruction to the display device to display the content. The message may comprise an instruction from the at least one application to the display device to display data and the interception means may be configured to modify the instruction to cause the display device to display alternative or additional material on the display device.

The system may further comprise monitoring means for monitoring the state of the user terminal, wherein the content providing means may be configured to provide the alternative or additional content in dependence on the state of the user terminal.

At least one of the content providing means, the selecting means and the monitoring means may be comprised in the at least one further application.

The monitoring means may be configured to monitor output data for output by a hardware device and to determine the state of the user terminal from the output data.

In another independent aspect of the invention there is provided a method of controlling a self-service terminal that comprises at least one application and an application programming interface (API) comprising an interface to at least one hardware device of the user terminal, wherein the method comprises intercepting a message sent the at least one application or the API.

The method may comprise intercepting the message with at least one proxy API.

Said one of the application and the API may be configured to send the message to a destination represented by destination data, and the method may comprise modifying the destination data. The destination data may comprise at least one registry entry.

The intercepted message may be a message to a hardware device from the at least one application, and the method may comprise providing the message to the hardware device.

The method may comprise providing the intercepted message to the hardware device via the API.

The API may comprise at least one function, and the method may comprise calling the or at least one of the functions included in the API.

The method may further comprise amending the intercepted message and providing the amended message to the hardware device.

The intercepted message may comprise at least one command from the at least one application to a hardware device, and the method may comprise amending the at least one command.

The method may comprise amending the message to provide content that is additional or alternative to content that is included in the intercepted message.

The message may comprise at least one command from the at least one application to a receipt printer device to print a receipt, and the method may comprise amending the message to cause the receipt printer device to print alternative or additional content on the receipt. The additional or alternative content may comprise advertising content.

The message may be a message intended for the at least one application and the method may comprise providing the intercepted message to the at least one application.

The method may comprise sending the intercepted message and/or at least some data included in the intercepted message to at least one additional destination, in addition to the at least one application or API.

The method may comprise providing the intercepted message or data included in the intercepted message to at least one further application. The at least one application may be for providing basic functionality of the user terminal, and the at least one further application may be for providing additional functionality.

The at least one application may be configured to control at least one process of the user terminal, and the method may further comprise providing content to a user that is additional or alternative to any content provided to a user by the at least one application in the at least one process.

The method may comprise selecting the additional or alternative content in dependence on the intercepted message or data included in the intercepted message.

The data included in the intercepted message may comprise card or user data and the method may comprise selecting the additional or alternative content in dependence on the card or user data.

The method may comprise determining at least one property of the user in dependence on the card or user data and to selecting the content in dependence on the at least one property of the user.

The method may comprise monitoring the state of the user terminal and providing the additional or alternative content in dependence on the state of the user terminal.

The method may comprise monitoring output data for output by a hardware device and determining the state of the user terminal from the output data. The output data may comprise content data for output to a user.

In another independent aspect of the invention there is provided a computer program product comprising computer executable instructions for performing a method as claimed or described herein.

In a further independent aspect of the invention there is provided a proxy API for use in a self-service terminal, configured to receive a message from at least one application in place of an API that comprises an interface to at least one hardware device of the self-service terminal, and to provide the message to the at least one hardware device.

Any feature in one aspect of the invention may be applied to other aspects of the invention, in any appropriate combination. In particular, apparatus features may be applied to method features and vice versa.

BRIEF DESCRIPTION OF THE DRAWINGS

At least one embodiment of the invention will now be described, by way of example only, with reference to the accompanying drawings, in which.

DETAILED DESCRIPTION OF EMBODIMENTS

Figure 1:
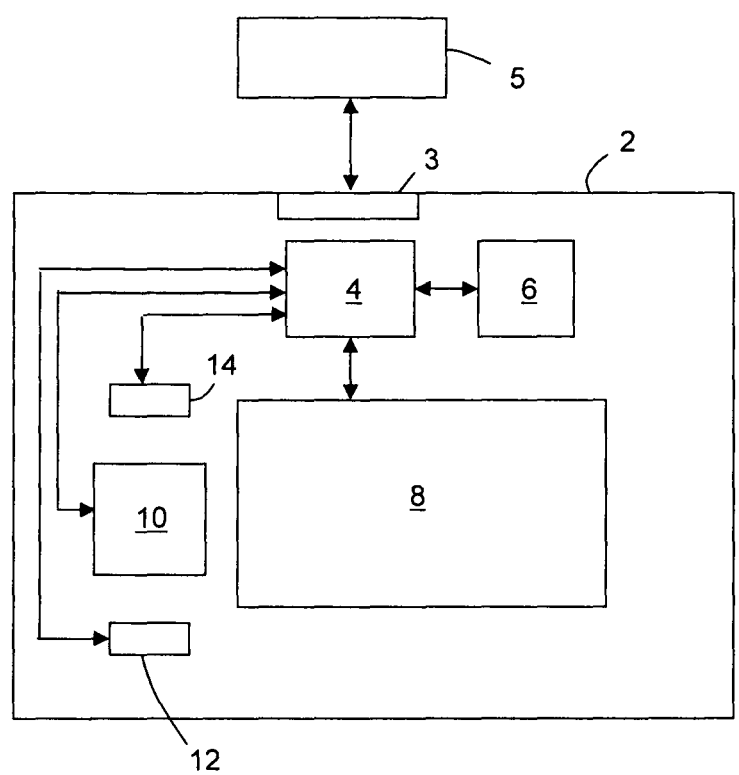
FIG. 1 is a schematic illustration of an ATM.

Various components of an ATM 2 are illustrated schematically in FIG. 1. The ATM 2 includes a processor 4 connected to a data store 6 and various hardware devices, for example a display device 8, a keypad 10, a card reader device 12 and a receipt printer 14. The ATM 2 also includes a cash dispensing device (not shown) and a slot (not shown) through which cash is dispensed by the cash dispensing device. The ATM 2 also includes a slot (not shown) that can also be used to dispense a receipt printed by the receipt printer 14. The card reader device 12 can read magnetic stripes and/or smartcard chips.

In the embodiment of FIG. 1, the processor is an Intel compatible P1 233 MHz processor with 64 Mb of RAM configured to operate under any 32 bit Windows operating system. The memory 6 comprises a 100 Mb hard disk, the display device 8 is a 16 bit colour screen device and the receipt printer 14 is a thermal enabled printer. The keypad 10 comprises a number pad and control buttons (for example, cancel and enter) and can also include function buttons either side of the display for interface control.

The ATM 2 also includes network communication circuitry 3 and software (not shown) that enables it to communicate with a server 5 via a secure network. The server 5 is able to provide data to the ATM 2, and to other ATMs in the network, and provide authorisation for user transactions, for example financial transactions, in accordance with known techniques. The server is also able to download and remotely install software on, and monitor operation of, the ATM 2 and other ATMs in the network.

Any suitable server 5 can be used. In one example, the server 5 comprises a Dual-Core Intel Xeon Processor 5100 Series 2 GHz (or Intel compatible with equivalent performance), 2 GB RAM, 2×140 GB hard disks (mirrored) with SQL Server database, Microsoft Windows 2003 Server, Microsoft SQL Server 2000 SP2 or 2005 access to the SQL Server database, SQL Server BCP, ADO 2.8, MSXML 3.0, DirectX 9.0c, IIS 6.0, and anti-virus software.

In operation, the processor 4 is able to communicate with and control operation of the various hardware devices, under control of applications running on the processor. Upon power-up of the ATM 2 a basic input-output system (BIOS) is booted from non-volatile storage (not shown) included in the processor 4, and the operating system, applications, API components and device drivers are then installed from the memory 6 by the processor 4 to form an ATM processing system.

Figure 2:
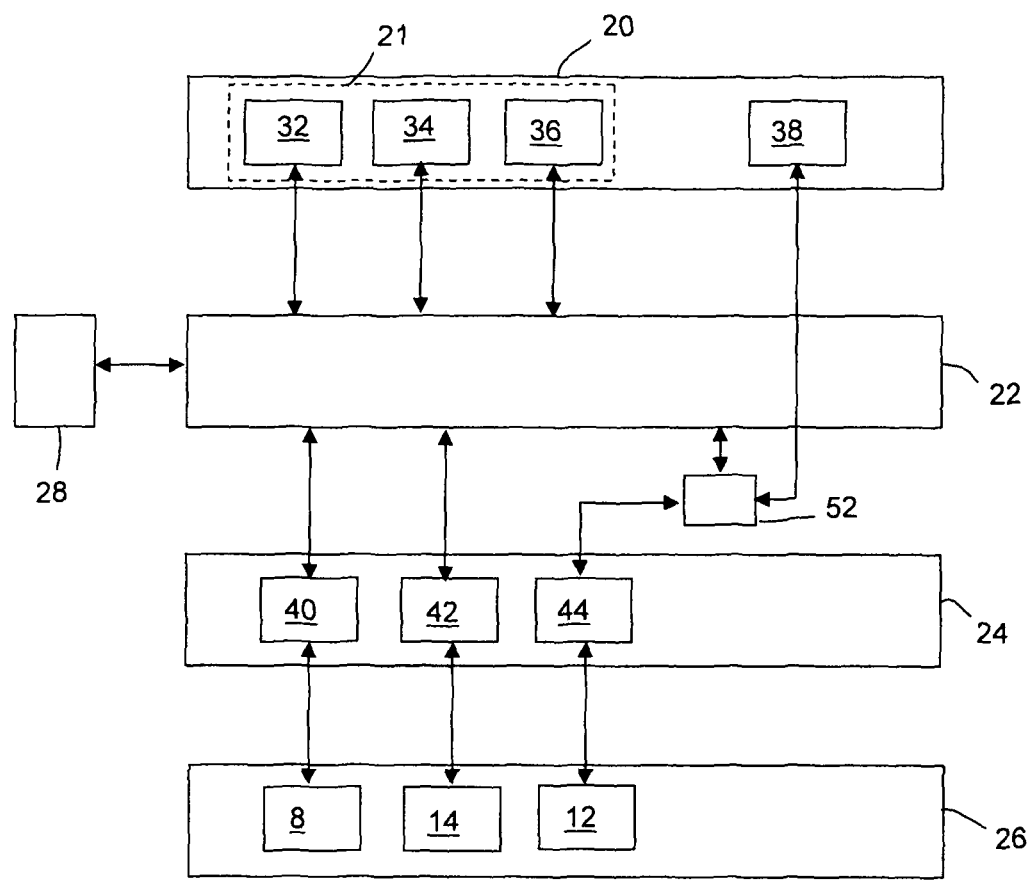
FIG. 2 is a schematic illustration of an ATM processing system.

The ATM processing system is illustrated schematically in overview in FIG. 2, and comprises an application layer 20, an XFS manager 22, an API layer in the form of XFS layer 24, a hardware layer 26 and a registry 28.

The application layer comprises a plurality of application modules and three application modules 32, 34, 36 that make up an ATM application 21 are shown by way of example, together with a further application 38. In the embodiment of FIG. 2, the application modules 32, 34, 36 provide some of the basic functionality of the ATM, and the application 38 provides additional functionality, as described in more detail below. In one mode of operation, the application 38 is provided and installed by a third party rather than by the ATM manufacturer or administrator. The application modules are provided under any XFS-compatible application environment, for example Kalignite, NCR APTRA or a Wincor application environment, such as WincorProTopas. Examples of ATM applications include NCR Advance NDC or Edge, Wincor ProCash NDC, and Diebold Agilis.

The XFS layer 24 comprises a plurality of service provider modules, and three service provider modules 40, 42, 44 are illustrated by way of example. The illustrated service provider modules 40, 42, 44 support communication with and control of the particular keypad 10, card reader device 12 and receipt printer 14 included in the ATM 2. Other service provider modules, not shown, are included in the XFS layer to support communication with and control of other hardware devices included in the ATM 2. A further middleware layer (not shown), for example KAL Kalignite, Pheonix VISTAatm, or Nexus, is also provided in some variants to simplify the implementation of the ATM application.

Further service provider modules, not shown, are also usually included in the XFS layer 24 that are able to support communication with hardware devices of other manufacturers, for example keypads, card reader devices and receipt printers of other types or other manufacturers, but are usually not used unless a hardware device, for example keypad 10, is replaced with a hardware device of another type or another manufacturer, for example a keypad of another type.

The system also generally includes a manufacturer- and/or hardware-specific platform layer (not shown), which can be considered to form part of the hardware layer 26, and comprises the various drivers or other components needed to control operation of the physical hardware devices. The service provider modules 40, 42, 44 are usually compatible with a single type of platform layer, but the XFS messages sent from the application layer are non-platform specific and so the service provider modules 40, 42, 44 are able to communicate with and receive instructions from any ATM application.

In operation, the application modules 32, 34, 36 in the application layer control the basic functionality of the ATM 2. For example, the application modules control the sequence of operations required for withdrawal of cash by a user, or other user functions. Each sequence of operations may require, for example, one or more of the reading of a user's card, the entry and checking of a user's PIN, the entry and checking of a user's personal and financial details, such as account balance and withdrawal limit, the retrieval of requested information, and the dispensing of cash. Each sequence of operations also usually requires the display of predetermined screens including instructions or other information at predetermined points in the process.

The combination of application modules 32, 34, 36 that provides the basic functionality of the ATM are also referred to herein as the ATM application 21. As mentioned above, a further application 38 is also provided that provides additional functionality.

In order to perform the sequence of operations, the application modules instruct the hardware devices to perform requested actions and receive data from the hardware devices. Messages between the application layer and the hardware layer are sent via the XFS Manager 22 and the XFS layer 24.

The registry 28 stores keys, also referred to as strings, that map hardware device calls to particular service provider modules in the service provider layer. The XFS manager 22 is in communication with the registry 28, and upon initialisation of the system or ATM application 21 the XFS manager 22 reads the appropriate keys from the registry 28 for the installed hardware devices and provides the keys to the application layer, so that subsequent hardware device messages from the ATM application 21 are directed to the service provider identified by the appropriate key.

As can be seen from FIG. 2, the processing system includes an additional component in the path between the XFS manager 22 and the API layer, in this case the service provider layer 24. The additional component is arranged to intercept messages between the application layer and the XFS layer. In the embodiment of FIG. 2, the additional component is a proxy API 52 and is located in the path between the XFS manager 22 and the service provider layer 24. The proxy API 52 is a CEN XFS SPI compliant pass-through service provider.

A proxy in this context can be considered to be a replacement program (for example a DLL) for a particular part of an application, API or other software. The proxy may provide at least some of the functionality that the application, API or other software provides in normal operation. In addition, it may be able to observe data flows, or if required modify a process or data to meet an objective. In the example of FIG. 2, the proxy API 52 comprises a DLL that is used as a replacement for the card reader XFS service provider module 44 (which, as discussed is a standardised API which controls the behaviour of the card reader driver specific to the ATM platform).

In the example of FIG. 2, the proxy API 52 is installed onto an existing system and is directed to control of and communication with one of the hardware devices, in this case the card reader 12. In order to ensure that messages from the application layer 20 are directed to the proxy API 52 rather than going directly from the XFS manager 22 to the existing service provider module 44, the key stored in the registry 28 for the hardware device is altered.

For example, the appropriate key may be:—
HKLM\SOFTWARE\XFS\SERVICE_PROVIDERS\IDC\DLLNAME
where the card reader is referred to as the XFS IDC device. In this case, DLLNAME is the key, and the string value of the key is the filename of the DLL. The string value of the key is altered in this example to refer to the filename of the proxy API 52.

In alternative embodiments, interception of messages by the proxy API or other interception device is obtained without modification of registry keys. For example, the interception device can monitor for messages on the communication path between the application and the service provider module, and intercept at a suitable point on the path during the communication process. Alternatively, a proxy DLL file of the proxy API can be placed in a folder higher up in the search hierarchy used by the application to load the service provider module 44 or DLL—thereby forcing the proxy DLL file to be loaded instead.

By replacing the existing service provider module 44 or DLL, it might seem that it is necessary to implement all of the normal functions of the service provider module 44 in the proxy API 52 in order to control the ATM hardware-specific card reader 12. However, in the embodiment of FIG. 2 that is avoided by ensuring that in response to each call to a function in the proxy API 52, the original functions of the original service provider module 44 are called by the proxy API 52, and the proxy API 52 only processes data or modifies behaviour where necessary to provide the desired additional functionality.

In the embodiment of FIG. 2, the proxy API 52 passes all messages, for example all commands, received from the application layer on to the existing, hardware vendor's IDC CEN XFS compliant service provider module 44, which passes the commands on to the card device 12. Messages from the card reader device 12 in response to commands are passed back to the service provider module 44 which in turn passes them back to the ATM application 21 along the path back to the application layer. In this case, the path passes via the proxy API 52. In variants of the embodiment, messages are sent between the proxy API 52 and the hardware layer without going through, or without calling functions from, the service provider module 44.

The proxy API 52 is able to process the received information and other messages and pass data included in the messages to the further application 38 in addition to the ATM application 21. In this example, the data is card data read by the card reader device 12 and includes one or more of, for example, cardholder name, Primary Account Number (PAN) and card 'application' (meaning issuer/institution responsible for the credit/debit processing, such as Mastercard or Visa).

The data provided to the further application 38 can be used for any desired purpose or to provide any desired functionality. In the example of FIG. 2, the further application 38 processes the data to extract information relevant to targeted marketing, and selects and provides marketing content to the user via the ATM. An example of targeted marketing functions that can be provided by the application 38 are described in more detail below.

No application changes are needed to install the proxy API 52.

The successive stages of one example of a process flow that is performed by the embodiment of FIG. 2 in order to read magnetic strip data from a card is outlined in Table 1 below.

TABLE 1

| Stage | Component | Received Data | Action | Sent Data |
|---|---|---|---|---|
| 1 | ATM application 21 | Internal - hits idle state | Request card data | IDC XFS command to request magstripe data |
| 2 | Proxy API 52 | IDC XFS command to request magstripe data | Send on to service provider module 44 | IDC XFS command to request magstripe data |
| 3 | User | — | Enters card | Data read from magstripe |
| 4 | Service provider module 44 | magstripe data from hardware | Notify application | magstripe data packaged as XFS response |

TABLE 1-continued

| Stage | Component | Received Data | Action | Sent Data |
|---|---|---|---|---|
| 5 | Proxy API 52 | XFS response magstripe data | Send to further application 38 and then ATM application 21 | Processed magstripe data to further application 38. Original XFS response to ATM application 21 |
| 6 | Further application 38 | Processed magstripe data | — | — |
| 7 | ATM application 21 | XFS response magstripe data | Start transaction (usually read the chip at this stage) | IDC XFS command to read chip |
| 8 | Proxy API 52 | IDC XFS command to read chip data | Record some details of the command sent to the chip Send on to service provider module 44 | IDC XFS command to read chip data |
| 9 | Service provider module 44 | Chip data read from smartcard | Notify application | Chip data packaged as XFS response |
| 10 | Proxy API 52 | XFS response chip data | Send to further application 38 and then ATM application 21 | Processed chip data to further application 38. Original XFS response to ATM application 21 |
| 11 | Further application 38 | Processed chip data | Select advertising or other content | — |
| 12 | ATM application 21 | XFS response chip data | Continue transaction (such as request PIN) | — |

The data formats of the various data mentioned in Table 1, in one mode of operation, are provided in Table 2 below.

TABLE 2

| Data type | Format |
|---|---|
| IDC XFS command to request magstripe data | WFS_CMD_IDC_READ_RAW_DATA command as detailed in Doc1, section 5.7. Specific data is ATM application dependent (such as which tracks to read etc.) |
| Data read from magstripe by hardware | Vendor specific |
| Magstripe data packaged as XFS response | WFSIDCCARDDATA structure in response to WFS_CMD_IDC_READ_RAW_DATA command as detailed in Doc1, section 5.7. Specific data returned is ATM application and customer card dependent |
| Processed magstripe data to application 38 | As per the WFS_CMD_IDC_READ_RAW_DATA command's response prefixed with: DWORD dwMessage = ePipePlayerMsg_CardRawData = 10 DWORD dwRecords = no. of WFSIDCCARDDATA records |
| IDC XFS command to read chip data | WFS_CMD_IDC_CHIP_IO command as detailed in Doc1, section 5.9. Specific data is ATM application dependent and defines the communication protocol between ATM application and Smartcard application |
| Chip data packaged as XFS response | WFSIDCCHIPIO structure in response to WFS_CMD_IDC_CHIP_IO command as detailed in Doc1, section 5.9 |
| Processed chip data to application 38 | The Proxy API 52 maps this structure to the lpbChipData member of the WFS_CMD_IDC_CHIP_IO data structure sent by the ATM application 21 to the smartcard chip. It represents the header of an APDU command (see Doc2, section 6 for details of the standard): struct sChipCmd {     BYTE bCla;     BYTE bIns;     BYTE bP1;     BYTE bP2;     BYTE bP3; }; The bIns member then identifies the instruction being sent. If this is a 'read record' command (Doc2, section 6.5.11) then we record the XFS command reference ID When the response comes back from the service provider module 44, the proxy API 52 receives the data, identifies it by the recorded reference ID and so has access to the data returned by the smartcard chip in the |

TABLE 2-continued

| Data type | Format |
|---|---|
| | IpbChipData member of the WFSIDCCHIPIO structure. It identifies the record as being a 'read record' type and sends the record data to the application 38 for processing
The application 38 then processes the data using an algorithm to process a BER-TLV structure (see Doc2, annex B for details of the standard). From here the application 38 obtains (all raw ASCII text) card holder name data, the Primary Account Number (PAN) and the ATM application name using the tags defined in Doc2, annex A. |

The documents Doc1 and Doc2 mentioned in Table 2 are as follows: —

Doc1:—The XFS IDC SP API standard (reference CEN CWA 15748-04, July 2008) including commands, data structures and C include file.

Doc2:—The EMV 4.2 specifications of June 2008 including APDU protocol and BER-TLV data format. (http://www.emvco.com/specifications.asqx?id=155).

In an alternative mode of operation, the further application 38 does not use the proxy API 52 and instead uses the existing XFS service providers in the service provider layer 24 to access ATM hardware devices (for example to send commands to the card reader 12 to acquire data from the card.

However, in that case it can take longer for the card to be read, as both the ATM application 21 and the further application 38 must read the card, and the card can only be read by one application at a time. That can result in delay for the user and, in the case where the application 38 is used to provide direct marketing content to the user, a delay in selecting and providing marketing content based in information acquired from the card data.

Furthermore, if communications with the card are not co-ordinated between the two applications (for example the ATM application 21 and the further application 38), one application (usually the ATM application 21) can be left in a wrong state resulting in subsequent communications (and ultimately transactions) failing.

Nevertheless, the alternative mode of operation in which the further application 38 does not use the proxy API 52 may be used for some ATM set-ups and for some applications.

In the example described above in relation to FIG. 2, the proxy API 52 is used to pass a copy of data from the card reader device 12 intended for the ATM application 21 to the further application 38. In other embodiments, a proxy API can be used to obtain data from any other hardware device, if desired. More than one proxy API can be provided, in order to obtain data from more than one hardware device. In addition, proxy APIs can also be used to amend instructions sent to hardware devices from the application layer, for example by adding to or modifying the instructions. The proxy APIs can also be used to provide additional instructions to hardware devices, independently of any instructions from, for example, the ATM application 21.

Figure 3:
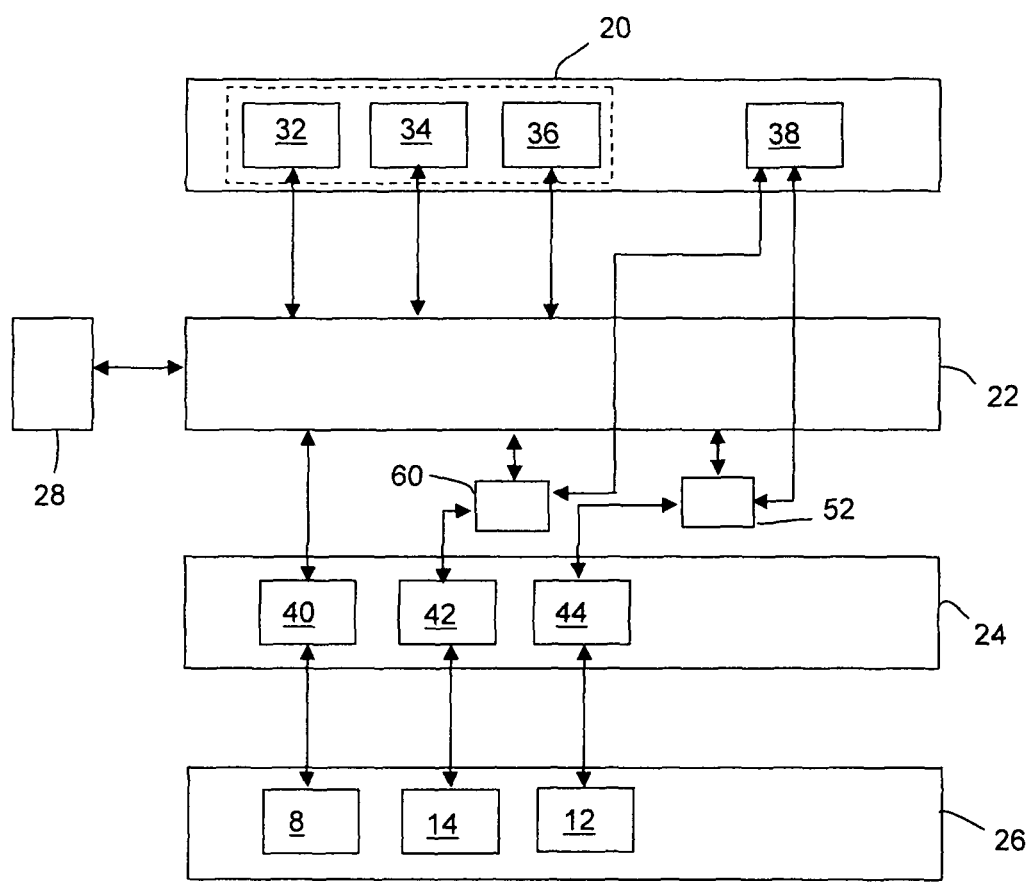
FIG. 3 is a schematic illustration of an ATM processing system in an alternative embodiment.

An alternative embodiment of the ATM processing system, in which a proxy API is used to control operation of a hardware device is illustrated in overview in FIG. 3. In the embodiment of FIG. 3, it can be seen that a further proxy API 60 has been provided, which is used to communicate with and control operation of the receipt printer 14.

Receipts are printed by the ATM application 21 for a number of purposes, including confirmation of withdrawal transactions, as a list of recent account transactions (mini-statement), or as confirmation of other transactions such as a mobile top-up. Usually there is sufficient blank space on the receipt to fit a graphical image or other additional content. In the embodiment of FIG. 3, the application 38 controls the appending of such additional content to the receipt, or the printing of alternative content on the receipt, via the further proxy API 60. The additional or alternative content printed in the receipt may, for example, complement on-screen marketing content (the display of which may also be controlled by the application 38) and thus provide the user with something to take away as a reminder of a marketing campaign.

In the embodiment of FIG. 3, the ATM application 21 would, in the absence of the further proxy API 60, usually communicate with the receipt printer 14 via the XFS service provider module 42. The further proxy API 60, which comprises a DLL, is used as a replacement for the receipt printer XFS service provider 42 (which, as discussed, is a standardised API which controls the behaviour of the receipt printer driver specific to the ATM platform). As discussed above in relation to the proxy API 52, the further proxy API 60 is able to call the original functions of the receipt printer service provider 42, thus avoiding having to replicate such functions, and only processes data or modifies behaviour where necessary.

In order to ensure that the proxy API 52 and further proxy API 60 are used in place of the corresponding service provider modules, the appropriate keys stored in the registry are modified.

In the embodiment of FIG. 3, the ATM application 21 is a Wincor ATM application. The details of the proxy APIs 52, 60 are added into the registry, and are treated as independent service provider modules by the system. In order to ensure that the proxy APIs 52, 60 are used a change is made to the Wincor multi-vendor service provider mapping string held in the following registry key:

[HKEY_LOCAL_MACHINE\Wincor Nixdorf\MvDetect\LOGICAL_OPEN_NAME_REPLACEMENT]

This key value is generated by the Wincor 'MvDetect' tool (which is included in the Wincor ATM application and determines whether or not the ATM or other hardware platform on which the application is installed is a Wincor ATM or other non-Wincor hardware platform) and replicated in two other places during initial configuration of Wincor ProTopas:

```
[HKEY_LOCAL_MACHINE\Wincor
Nixdorf\ProInstall\WOSASSP\
LOGICAL_OPEN_NAME_REPLACEMENT]
HKEY_LOCAL_MACHINE\Wincor
Nixdorf\ProTopas\CurrentVersion\CCOpen\CCWFS\
LOGICAL_OPEN_NAME_REPLACEMENT]
```

As it is not generally required to re-run the MvDetect tool and the other configuration procedures in the embodiment of FIG. 3, the further processing module 38 is used, once installed, to automatically update all three registry key values.

The string takes the general form '{WN SP}>{MV SP}, {VVN SP}>{MV SP}, . . . '. For example, the string may take the form: 'IDC30>IDCardUnit1, PRR30>ReceiptPrinter1, . . . '.

The further application 38 modifies the key value to add in the proxy APIs 52, 60 providers. These will appear first in the list. So the example of the preceding paragraph becomes:

```
'IDC30>ATMAD_IDCardUnit1,IDC30>IDCardUnit1,
PRR30>ATMAD_ReceiptPrinter1,PRR30>ReceiptPrinter1,...'.
```

One feature of this approach is that, should the Wincor configuration process be re-run (such as by the MvDetect tool), it will automatically configure itself to use the proxy APIs 52, 60 as these will be identified as valid and meeting the required criteria.

The further proxy API 60 is configured to forward to the further application 38 instructions from the ATM application 21, or at least some of the content of such instructions, that are intended for the receipt printer 14. The further application 38 processes the instructions or content, selects additional or alternative graphical or other content to be appended to the receipt or to be included on the receipt by modification of the original content, and determines the location on the receipt where the additional graphical or other content is to be appended.

The further application 38 then sends a further instruction to the further proxy API 60 to instruct the amendment of the receipt printer instructions to include the additional graphical or other content to be appended to the receipt at the selected location. The further proxy API 60 then passes the amended instructions to the receipt printer 14 via the service provider 42. The receipt printer 14 prints the receipt as instructed by the ATM application 21, but with the additional graphical or other content appended to the receipt, or with the receipt content modified.

The successive stages of one example of a process flow that is performed by the embodiment of FIG. 2 in order to print content to a receipt are described in overview in Table 3 below.

TABLE 3

| Stage | Component | Received Data | Action | Sent Data |
| --- | --- | --- | --- | --- |
| 1 | ATM application 21 | Internal - hits receipt print state | Send raw receipt data to the printer 14 | IDC XFS command to send raw data to the receipt printer 14 |
| 2 | Proxy API 60 | IDC XFS command to send raw data to the receipt printer | Process raw data and if appropriate append image reference/raw image data Send on to service provider module 42 | IDC XFS command to send potentially augmented raw data to the receipt printer 14 |
| 3 | Service provider module 42 | IDC XFS command to send raw data to the receipt printer | Send raw data to printer 14 to print receipt | Vendor hardware specific structure containing raw printer data |

The stages listed in Table 3 may be repeated several times for a single transaction print. This is due to the fact that there may be several chunks of data to send to the printer before the receipt is ejected for the customer. During stage 2, the content is processed to determine if this is the last print command being sent to the printer for the individual transaction. This is determined by the existence of a 'form feed' escape code in the raw data, or a specific XFS 'eject' command.

In practice, the transaction receipt printing process can be more complex that as outlined in Table 3 in some scenarios. However, the proxy API 60 is able to deal with such more complex scenarios.

In some scenarios, rather than sending the raw ASCII and escape codes to the printer, different data is sent to the service provider layer which formats the content for the printer using an XFS methodology known as 'forms'. Forms are data structures which define the layout of printed content using pre-defined templates with fields which can be substituted with data at print-time. Printing using this method requires more involvement of the proxy API. The successive stages of a process flow that is performed by the embodiment of FIG. 2 in order to print content to a receipt in three different scenarios are described in overview in Tables 4 to 6 below.

In the first scenario, which is the subject of Table 4, the final form print command contains an embedded form-feed media control command.

TABLE 4

| Stage | Component | Received Data | Action | Sent Data |
|---|---|---|---|---|
| 1 | ATM application 21 | Internal - hits receipt print state | Send receipt form data to the printer 14 | IDC XFS command to send form data to the receipt printer 14 |
| 2 | Proxy API 60 | IDC XFS command to send form data to the receipt printer 14 | Process form data - analyse and decide whether to include receipt image. If data includes a form-feed command and we are going to append an image, suppress it for now but send rest of form data on to service provider module 42. This step repeats for each form printed to comprise transaction receipt | IDC XFS command to send form data to the receipt printer 14 |
| 3 | Service provider module 42 | IDC XFS command to send form data to the receipt printer 14 | Process form data into raw data and send to hardware to print receipt. Notify application on completion | Vendor hardware specific data |
| 4 | Proxy API 60 | Notification of completion of form print command | Suppress notification to ATM application 21 and instead, send a new XFS print raw data command to print the image and form-feed terminator to service provider module 42 | IDC XFS command to print the image and form-feed (eject) the receipt printer paper |
| 5 | Service provider module 42 | IDC XFS command to print the image and form-feed (eject) the receipt printer paper | Process into raw hardware data and send to hardware to print image contents and eject receipt. Notify application on completion | Vendor hardware specific data |
| 6 | Proxy API 60 | Notification of completion of print raw command | Modify response data to represent the original form print command and notify original ATM application 21 | XFS response data for original (final) form print command |

In the second scenario, which is the subject of Table 5, the final form print command is followed by an explicit XFS command to eject the receipt paper.

TABLE 5

| Stage | Component | Received Data | Action | Sent Data |
|---|---|---|---|---|
| 1 | ATM application 21 | Internal - hits receipt print state | Send receipt form data to the printer 14 | IDC XFS command to send form data to the receipt printer 14 |
| 2 | Proxy API 60 | IDC XFS command to send form data to the receipt printer 14 | Process form data - analyse and decide whether to include receipt image. This step repeats for each form printed to comprise transaction receipt | IDC XFS command to send form data to the receipt printer 14 |
| 3 | Service provider module 42 | IDC XFS command to send form data to the receipt printer 14 | Process form data into raw data and send to hardware to print receipt. Notify application on completion | Vendor hardware specific data |

TABLE 5-continued

| Stage | Component | Received Data | Action | Sent Data |
|---|---|---|---|---|
| 4 | Proxy API 60 | Notification of completion of form print command | Send on to ATM application 21 | Notification of completion of form print command |
| 5 | ATM application 21 | Notification of completion of form print command | Send final media control eject command | IDC XFS media control command to eject the receipt printer paper |
| 6 | Proxy API 60 | IDC XFS media control command to eject the receipt printer paper | Modify XFS command to instead send raw data which includes the image and a form-feed terminator | IDC XFS print raw command with image data and form-feed terminator |
| 7 | Service provider module 42 | IDC XFS print raw command with image data and form-feed terminator | Process data into raw data and send to hardware to print image and eject paper. Notify application on completion | Vendor hardware specific data |
| 8 | Proxy API 60 | Notification of completion of raw print command | Modify response back to just media control command and return to service provider module 42 | IDC XFS media control command response data |

In the third scenario, which is the subject of Table 6, the final form print command is followed by an XFS print raw command to some final raw text or command codes and eject the receipt paper.

TABLE 6

| Stage | Component | Received Data | Action | Sent Data |
|---|---|---|---|---|
| 1 | ATM application 21 | Internal - hits receipt print state | Send receipt form data to the printer 14 | IDC XFS command to send form data to the receipt printer 14 |
| 2 | Proxy API 60 | IDC XFS command to send form data to the receipt printer 14 | Process form data - analyse and decide whether to include receipt image. This step repeats for each form printed to comprise transaction receipt | IDC XFS command to send form data to the receipt printer 14 |
| 3 | Service provider module 42 | IDC XFS command to send form data to the receipt printer 14 | Process form data into raw data and send to hardware to print receipt. Notify application on completion | Vendor hardware specific data |
| 4 | Proxy API 60 | Notification of completion of form print command | Send on to ATM application 21 | Notification of completion of form print command |
| 5 | ATM application 21 | Notification of completion of form print command | Send final print raw command which includes a form-feed terminator | IDC XFS print raw command to print some raw data and eject the receipt printer paper |
| 6 | Proxy API 60 | IDC XFS print raw command to print some raw data and eject the receipt printer paper | Append image data to raw data | IDC XFS print raw command including image data and form-feed terminator |
| 7 | Service provider module 42 | IDC XFS print raw command including image data and form-feed terminator | Process data into raw data and send to hardware to print image and eject paper. Notify application on completion | Vendor hardware specific data |

The data formats of the various data mentioned in Tables 4 to 6, in one mode of operation, are provided in Table 7 below.

TABLE 7

| Data type | Format |
|---|---|
| IDC XFS command to send raw data to the receipt printer 14 | WFS_CMD_PTR_RAW_DATA command as detailed in Doc3, section 8.4. Data includes ASCII and escape codes to define content and control printer behaviour and modes. '0x0c' is the form-feed terminator escape code |
| IDC XFS command to send form data to the receipt printer 14 | WFS_CMD_PTR_PRINT_FORM command as detailed in Doc3, section 8.2. Data includes form name (which specifies the predefined form to use - detailed in section 10) and form field values. Additionally there is a media control command which can, for example trigger the paper eject after printing |
| IDC XFS command to control receipt printer media | WFS_CMD_PTR_CONTROL_MEDIA command as detailed in Doc3, section 8.1. Data includes control command, for example WFS_PTR_CTRLEJECT |
| Notification of completion of XFS PTR commands | Standard WFSRESULT structure containing reference to request ID and command code used (detailed in Doc4 section 9.1) |

The documents Doc3 and Doc4 mentioned in Table 7 are as follows: —
Doc3:—The XFS PTR SP API standard (reference CEN CWA 15748-3, July 2008) including commands, data structures and C include file.
Doc4:—XFS API and SPI standard (reference CEN CWA 15748-3, July 2008) including general commands, data structures and C include file.

The further application 38 can control where the additional or alternative graphical image or other content is rendered on the receipt. In some modes of operation, the further application replaces, deletes or reformats some of the original content of the receipt before printing. For example, the original content may be reformatted to make room for the graphical image to be appended.

The further application 38, in certain modes of operation, also analyses the original content to be included on the receipt to determine whether or not to include any further content. The further application 38 may perform a regular expression string search on the original content to determine whether to include any further content. For example, the further application 38 could be configured to include further content on the receipt only if the receipt is a withdrawal receipt, and not to include any further content if the receipt is a receipt indicating that a user is overdrawn. The regular expression string search could then search for expressions such as "withdrawal amount", "new balance", "overdrawn", or "refused" to determine what kind of receipt is to be printed and whether to include further content.

The receipt types, or content, that trigger the appending of the graphical image or other content to the receipt and/or the modification of original content of the receipt, may differ between ATMs or between ATM applications, and may be determined on a case-by-case basis.

In an alternative mode of operation, the further application 38 sends commands to the receipt printer 14 using the standard XFS service provider module 42. However that does not allow the graphical content to be added to existing content printed on ATM transaction receipts. Instead a separate receipt containing the graphical image or other additional content would be printed after the transactional receipt.

In some ATMs the ATM application usually communicates with the receipt printer 14 via a Windows GDI printer device, for example a receipt printer GDI port monitor 70, rather than via an XFS service provider. An alternative embodiment of an ATM processing system for use in such ATMs is illustrated in FIG. 4.

Figure 4:
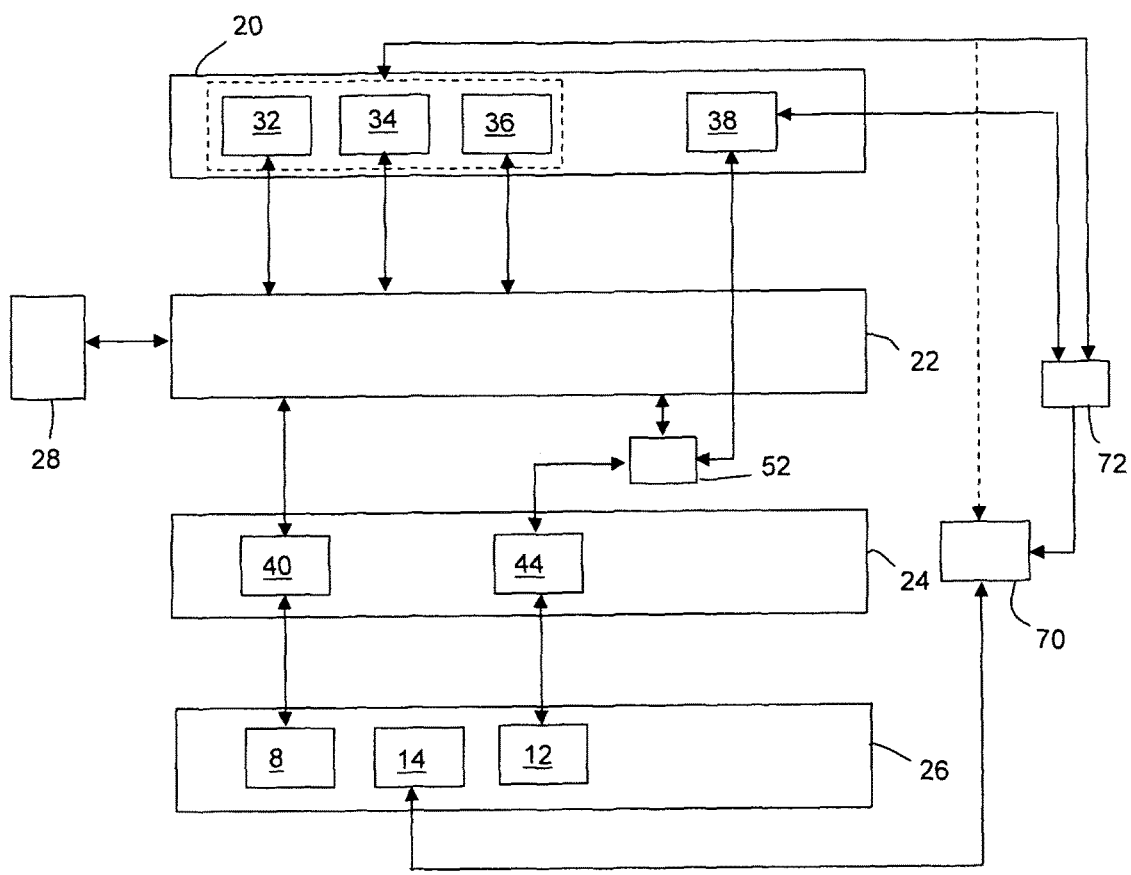
FIG. 4 is a schematic illustration of an ATM processing system in another alternative embodiment.

In the embodiment of FIG. 4, a proxy API 72 (comprising a DLL) is used as a replacement for the receipt printer GDI port monitor 70 (which is a standardised Windows API which provides functions for controlling the receipt printer hardware by Windows applications through the standard GDI printer interface). A port monitor exists for the ATM platform as it must translate GDI commands to hardware specific commands. As was the case with the proxy APIs 52, 60 discussed above the hardware, in this case the receipt printer 14, is not controlled directly by the proxy API 72, but instead the original functions in the original port monitor are called by the proxy API 72, which also operates to append the graphical image content in the appropriate place.

The embodiments of FIGS. 3 and 4 provide non-platform specific approaches to appending content to the receipt content sent to the printer by the ATM application 21, and avoid the requirement for platform-specific integration with the ATM application 21.

The further application 38 is able to communicate with and control operation of the display device 8 as well as or instead communicating and/or controlling operation of the card reader device 12, the receipt printer 14 and other hardware devices. It is usual for the ATM application to control the display device 8 directly via the operating system layer using a standard Windows or other operating system component, for example the Windows GDI or DirectX APIs, rather than via the XFS layer.

Figure 5:
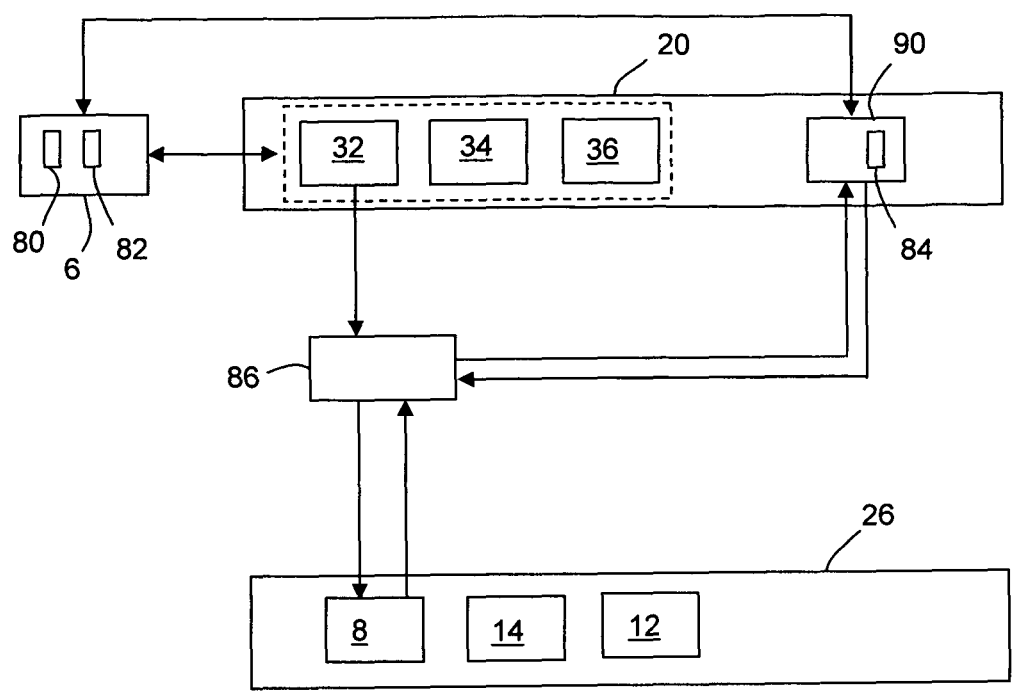
FIG. 5 is a schematic illustration of further aspects of an ATM processing system in a further alternative embodiment.
Figure 6:
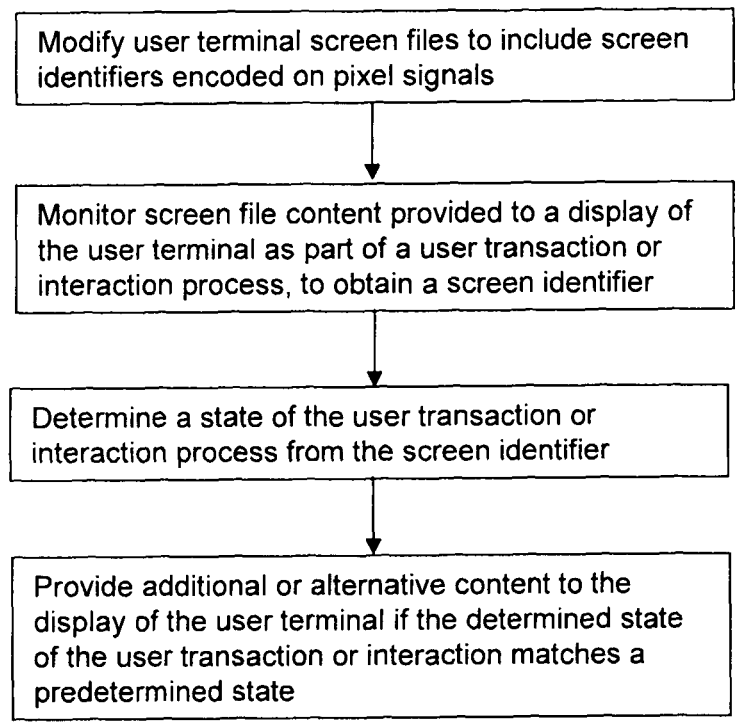
FIG. 6 is a flowchart illustrating a mode of operation of the embodiment of FIG. 5.

An example of an embodiment of an ATM processing system in which the ATM application 21 controls the display device 8 via a standard Windows display driver is illustrated in overview in FIG. 5. A mode of operation of the embodiment of FIG. 5 is illustrated in the flowchart of FIG. 6.

On all ATM platforms, display data in the form or screen files 80 held on the hard disk 6 of the ATM 2 are loaded and rendered by the ATM application 21 on the display device 8 to prompt user interaction. These are known as the user interface screens. In operation, the ATM application 21 retrieves from amongst the screen files 80 the appropriate screen file for each stage in a transaction and sends the screen file data to the display device 8 via the operating system 86 for rendering and display of the corresponding user interface screen during that stage of the transaction. It will be understood that there may be further components between the operating system and the display device 8, for example device drivers, but these are not shown for clarity.

In the embodiment of FIG. 5, the further application 90 is arranged to display further screens on the display device 8 during a transaction. In one mode of operation, described in more detail below, the further application 90 presents marketing content on the display.

The screen files 82 for the further screens displayed on the display device 8 by the further application 90 are stored on the hard disk 6. In operation, the further application 90 determines the state of the ATM application 21, usually the stage that has been reached in a user interaction or transaction, selects an appropriate further screen (for example, selected marketing content) for display at that stage, retrieves the corresponding screen file from the hard disk 6 and sends the screen file data to the display device 8 via the operating system 86 for display of the selected further screen. The application 90 may modify the data before sending to the display device, for example to include personalised details for a particular user. The selected further screen either replaces or overlays the current user interaction screen on the display device 8.

The screen data files contains data in one of a range of formats which is presented on the consumer display using an appropriate renderer. Formats for the screen data files include, for example, JPEG, PCX and HTML.

The application 90 comprises a state detection module 84 that determines the state of the ATM application 21, for example the stage that has been reached in a user interaction or transaction.

The state detection module 84 determines the stage that has been reached by matching the screen file data sent to the display device by the ATM application to screen file data that may be displayed at stages of the interaction or transaction.

In one embodiment, the state detection module 84 compares the entirety of the screen file data that is sent to the stored screen file data. However that is time consuming, and also requires the state detection module 84 to have access to data representing all possible screens that may be displayed (which can vary significantly across different ATMs and different ATM applications).

In another mode of operation, the application 90 is configured to determine the state of the ATM application, based on what content is being presented to the user during the transaction, by employing an encoding/decoding or 'codec' technique. The encoding is applied to the screen data files which are used by the ATM application 21. The application 90 is configured to perform the encoding by modifying the screen files so that when the ATM application 21 renders them, a distinction can be detected by the further application 90 almost instantaneously. Each of the screen files can be encoded to include identification data, for example an identifier that enables identification of the display screen represented by that screen file.

An operator is able to predetermine which files represent particular stages of the interaction or transaction, and that information can be downloaded to the ATM 2 from the server 5. The application 90 receives the information from the server and uses it to encode the specified screens using an algorithm that results in a small, but specific modification to what will be rendered on the display.

The process to encode screen files is specific to each file format. However, for each file format the algorithm implemented by the embodiment of FIG. 5 is similar and comprises modifying the first few pixels (for example in the top left corner) of the image to contain coloured pixels representing an ASCII string code. The code comprises two parts—a 16-bit header value and a 32-bit key value. The 16-bit header is a fixed value used to prevent false-positives when decoding the consumer display image. The 32-bit key value is a lossless compressed version of a 6-character ASCII string. The characters are restricted to single-case letters of the alphabet for practical purposes and as such can be compressed into 5-bit chunks of the 32-bit key value (30 bits are used). Four 24-bit pixels are then encoded to represent the 48-bit code as such The pixel numbers and components and corresponding code parts are listed for one mode of operation in Table 8.

TABLE 8

| Pixel (component) | Code part From bit:To Bit (inclusive) |
| --- | --- |
| 1 (blue) | Header 3:0 |
| 1 (green) | Header 7:4 |
| 1 (red) | Header 11:8 |
| 2 (blue) | Header 15:12 |
| 2 (green) | Key 3:0 |
| 2 (red) | Key 7:4 |
| 3 (blue) | Key 11:8 |
| 3 (green) | Key 15:12 |
| 3 (red) | Key 19:16 |
| 4 (blue) | Key 23:20 |
| 4 (green) | Key 27:24 |
| 4 (red) | Key 31:28 |

Each component's upper (most significant) 4 bits are encoded with each 4-bit code part. This allows for some reduction in the colour bit-depth of the display the image is rendered to (such as down to a 16-bit desktop).

Each screen file format is then encoded by loading the file into memory, decompressing it to produce a raw 24-bit colour image, encoding the 4 pixels, then re-compressing the image back into its original format and replacing the original file on the hard disk 6.

To encode graphical image formats such as JPEG or PCX, the algorithm need merely modify the four 24-bit pixels held in memory as contiguous component parts of pixels—8 bits each. However for HTML files, the pixels are encoded by adding a new 'div' in HTML script to the file, that describes the pixels to be drawn at the top-left corner.

Detection of the appearance of the pixels during a transaction or interaction is subsequently conducted in real time by the further application 90, by regularly reading the pixels rendered by Windows at the top-left corner of the display screen of the display device 8. The four pixels read are decoded into their header and key string constituent parts. If the header string matches a key string stored by the application 90 and representing a particular state, the key string is used by the application 90 to identify the state.

The decoding process is conducted at (typically) every 50 ms during operation. Every period, the application uses Win32 API calls to the Windows operating system 86 to retrieve the pixel data of those pixels rendered to the consumer display at the top-left corner (or slightly offset as required depending on ATM application behaviour). The pixel data is then decoded using a reverse of the encoding algorithm to produce the Header and Key values. The header is checked against the fixed value to ensure the key is valid and the key is checked against known, pre-defined options.

If there is a match, then the appropriate action for that encoded key is taken. For example, the application 90 may determine based on predefined conditions whether the identified state is one for which content should be sent to the display device 8 to replace or overlay the displayed screen.

By using the pixel encoding described above, state detection can be conducted in a timely manner by the embodiment of FIG. 5 so that the presentation of marketing or other content is conducted within an imperceptible delay after the rendering of an ATM interface screen. In variants of the embodiment, for selected stages the further application 90 waits for a predetermined delay period after detection of the change to a particular state before presenting the marketing or other content.

All ATM applications render screens but in varying formats. The pixel encoding can be applied to all known formats and can provide for platform-independent state detection, without requiring specific knowledge of the ATM application's state flow, rendering method, or timing. State flows can change without the need to reconfigure the encodings.

The encoding and decoding techniques are not limited to those described above in relation to FIG. 5. For example, in the mode of operation described above, the state detection module requests rendered display data via Win32 API calls to the Windows operating system, for example to the DirectX or GDI API of the Windows operating system, whereas in alternative modes of operation the state detection module can intercept display data before it has been rendered, and after suitable processing to extract the encoded pixel values from the non-rendered data. That process is in general less efficient than extracting the pixel values from the rendered data. In other modes of operation the state detection module can address system components below the operating system in order to obtain the pixel values. The number and position of the pixels can also be varied. In many embodiments, the number and position of the pixels for encoding are selected so that the encoding, or differences in encoding between different screens, does not substantially affect the appearance of the display and/or is substantially imperceptible to the user. For example a small number of pixels may be used, and the pixels may be located at or near an edge or corner of the screen.

As mentioned above, the further application in embodiments of FIGS. 1 to 5 is an application for providing marketing or other content to a user. The marketing or other content is content that is usually additional to any content that is provided by the ATM application 21. The further application 38 can also provide additional user interaction processes, and process and store user response to such processes. As described herein, the further application can received data from and control hardware devices via the proxy APIs, the XFS service providers, or other existing APIs and device drivers.

The further application is downloaded from the server 5, or from a third party server, to the ATM 2 and installed.

Marketing and other content to be provided to a user is also downloaded from the server 5, or from a third party server, and stored in the data store 6. The content can be packaged and compressed in a single file for distribution. In alternative embodiments, the marketing and other content can be streamed from the server to the further application 38 when required.

Upon installation, the further application generates and installs one or more of the proxy APIs or APIs 52, 60, 72 as required.

The further application is operable to display full screen video or still images on the display device 6 in any suitable format. The further application includes state detection components that detect the settings and display state of the ATM 2, and optionally reports them to the server 5. The further application and/or the server 5 subsequently provides content in the correct resolution and file format for the ATM 2, and in particular for the display device and receipt printer of the ATM 2, based on the detected settings and display state.

The further application is platform independent, and is configured to run on multiple environments including Aptra, ProCash and Kalignite, all with or without web extensions, on any suitable hardware, including for example NCR, Wincor and Diebold ATMs and kiosks, and on using host communications protocol (for example NDC, 912)

The further application is configured to use strong (128 bit) encryption in data communication. In addition the application 38 uses digital signing and hashing technologies to ensure that received data has come from a validated source and has not been compromised, and integrates with any existing virus protection software to scan all incoming data. The application 38 is configured to communicate over the network using TCP/IP, HTTP or HTTPS.

The further application is able to provide content to a user at predetermined stages during a transaction or other user interaction, for example by displaying the content on the display device 8. Each piece of content can be referred to as a content module.

In one mode of operation, four stages during a transaction are used to display content modules. The four stages are during the idle sequence (before the user inserts their card), whilst the user is waiting for the transaction to be authorised, whilst the user is taking their card, cash and receipt, and when the user is examining their printed receipt.

The content modules displayed during these points can be referred to as the Attract, In-transaction, Thank you and Receipt Modules respectively. The content modules may form part of an advertising campaign, for example a third party advertising campaign.

In addition, a question can be presented to the user via the display device 10 whilst they are waiting for the transaction to be authorised and completed. The question is presented alongside the In-transaction module and is known in the system as a CTA (Call To Action prompt). The display of these modules do not lengthen the transaction time.

The Attract module is output during the idle sequence and is displayed when the machine is not being used. It typically comprises a full motion video, which is up to fifteen seconds long. This module can be alternated with other screens if desired.

The In-transaction module is output during the transaction sequence when activity such as authorisation, host-processing and cash-counting is being carried out. It typically comprises a 5 second full motion video and loops until the process is complete.

The further application determines whether there will be sufficient time for the In-transaction module to be displayed to the user. If this is the case then a question is displayed at the same time as the In-transaction Module. Icons are presented for the user to respond either positively or negatively.

The Thank-you module is displayed when the user completes the transaction. It typically comprises a still image presented to reinforce the messages displayed in previous modules.

Printed below user transaction information on the receipt is a graphical image/text of the message with 'take-away' information such as a telephone number or barcode for voucher redemption.

The modules are, in general, overlaid onto existing transaction screens. It follows that the transaction screens must be visually compliant with the advertising media provided by the application 38, and the application 38 or the server 5 is able to detect and replace any transaction screens that need modification.

The further application is also operable to present screens within the idle sequence which run alongside the attract module. Such screens can be referred to as the mandatory sequence or mandatory banking sequence and can be defined by the ATM or network operator (for example, a bank or other financial institution).

The mandatory sequence can contain any number of pieces of content. A still image can be displayed, for a user-defined period of time, or a movie played, at each stage of the sequence. If the ATM 2 is being used for a third party (non-bank) advertising campaign then in one mode of operation the first module presented during this sequence will always be the Attract Module. In addition, it can be specified that the Attract Module can never be off the screen for longer than a predetermined period, for example 10 seconds.

When the further application is not instructed to present an active advertising campaign then the further application displays a default advert at one or more of the predetermined stages of the transaction. The advert may contain a generic or non-time specific advertising message from the network owner. The system supports multiple default adverts and these can be assigned to a single ATM 2, or a group of ATMs 2. A priority system is available that allows an operator to override a default advert with a message of higher importance. When the higher priority message has run its course the system will fall back to playing the lower priority message. Default adverts can include modules of the type described above.

The further application is also able to present a personalised greeting to a user when they are performing a transaction. The greeting is personalised based upon card and/or user data obtained from the card reader device via the proxy API. The greeting is usually presented to the user whilst they are selecting the options for their transaction. The position and content of the greeting is configurable by an operator. The further application is able to determine whether user interaction screens are compatible or not before deciding to display the greeting.

A greeting can be specific to an ATM 2 or group of ATMs 2. The size, colour, font and position of the message are all configurable by or via the application 38. The greeting can be personalised by adding in the user's name. The name used can be defined as formal (Title and Surname if available) or informal (first name if available). In certain cases it is not possible to retrieve the user's name from the user's card, from the data store 6 or from the server 5. When this is the case an alternative greeting is displayed which is also configurable by or via the further application.

The further application is operable to provide other personalised content, by selecting content to display based upon one or more properties of a user, for example determined from card data obtained via a proxy API. The further application is able to obtain additional information relating to a user from the data store 6 or from the server 5. The user can be identified from the card data. The further application is also able to store data concerning the content that has been displayed to a user, and the user's response to the content. The data can be stored, for example, at the server 5. The data can then be used in tailoring content to the user during subsequent transactions.

In one example, the further application is able to identify cardholders, their age, sex, and other physical, financial, economic or social characteristics and tell them about products and services that may be relevant to them. The application is also able to control the number of times a specific communication is displayed to individual customers. The application 38 can apply filtering of content based upon, for example, socio-demographic profiling or age profiling.

The further application can also provide institutional profiling that identifies bank and non-bank customers, even down to bank specific detail. During processing time customers can be invited to answer a relevant question on-screen, their responses being collected, reported and exported for subsequent processing or follow-up.

The further application is also able to display personalized user prompts, which can be used to for example deliver a message reflecting the customer's current banking activity or status or to provide a targeted marketing message.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

It will be well understood by persons of ordinary skill in the art that whilst the embodiments described herein implement certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A monitoring system for an automated teller machine (ATM), the monitoring system comprising:
   an ATM user terminal, wherein the ATM comprises:
      a plurality of hardware devices, the plurality of hardware devices including a display device;
      an application layer comprising an ATM application for controlling a user transaction or interaction process of the ATM;
      an application program interface (API) layer;
      a hardware-specific platform layer comprising hardware device drivers for controlling operation of the hardware devices; and
      a data store storing a plurality of screen data files, wherein
      the user transaction or interaction process comprising providing under control of the ATM application display data represented by the screen data files to the display device of the ATM for rendering by the display device, wherein the display data comprises pixel data items representative of pixels representing display screens for display on the display device, and the system further comprises:
   at least one further application, wherein the at least one further application is configured to modify a selected at least one of the screen data files stored by the data store to include for said selected at least one of the screen data files an encoded identifier, wherein the identifier is encoded on a value of at least one pixel data item represented by the at least one screen data file and identifies a display screen represented by the screen data file; and the system further comprises:

a monitor for monitoring during the user transaction or interaction process the display data provided to the display device and for determining from the identifier encoded on the value of said at least one pixel data item whether the display data corresponds to a predetermined display screen, wherein the further application or at least one of the further applications is configured to replace or overlay said predetermined display screen with additional or alternative content in response to the monitor determining that the display data corresponds to the predetermined display screen; and the monitor is arranged to operate independently of said ATM application by monitoring the display data and determining a state of the user transaction or interaction process without requiring modification of said ATM application and without interfering with operation of said ATM application.

2. A system according to claim 1, wherein the user transaction or interaction process comprises the display of a sequence of display screens, and the monitor is configured to identify from the display data a display screen of the sequence.

3. A system according to claim 1, wherein at least one of:
a) the monitoring of the display data comprises monitoring rendered display data; or
b) the identifier is encoded on a color component value of said at least one pixel data item.

4. A system according to claim 3, wherein said at least one pixel data item comprises at least one pixel data item representative of a predetermined number of pixels, wherein the predetermined number of pixels is less than or equal to at least one of 10, 6, and 4.

5. A system according to claim 3, wherein the identifier is included in pixel data items representative of pixels for display at or near a predetermined location on the display of the display device, wherein optionally the predetermined location comprises an edge or corner of the display.

6. A system according to claim 3, wherein the monitor is configured to select said at least one pixel data item from the plurality of pixel data items and to monitor said selected at least one pixel data item.

7. A system according to claim 1, wherein the further application or at least one of the further applications is configured to replace or overlay said predetermined display screen with additional or alternative content is configured to at least one of:
a) synchronize the provision of additional or alternative content with the user transaction or interaction process; or
b) provide the additional or alternative content during at least one predetermined state of the user transaction or interaction process.

8. A system according to claim 1, wherein the monitor is configured to determine whether the determined state of the user transaction or interaction process matches a predetermined state, and the further application or at least one of the further applications is configured to provide the additional or alternative content in response to the determined state matching the predetermined state.

9. A system according to claim 2, wherein the further application or at least one of the further applications is configured to provide the additional or alternative content in response to detection of a predetermined one of the display screens of the sequence of display screens, and optionally to replace or overlay the predetermined one of the display screens with the additional or alternative content.

10. A system according to claim 1, wherein the further application or at least one of the further applications is configured to wait for a predetermined delay period before providing the additional or alternative content.

11. A system according to claim 1, further comprising means for modifying the display data to be provided to the display device to include the or an identifier, and further comprising the data store for storing the display data, wherein the modifying means is configured to modify display data stored in the data store and to store the modified display data in the data store for subsequent retrieval and output.

12. A system according to claim 11, wherein the display data comprises at least one screen data file comprising pixel data items, and the modifying means is configured to modify at least one of the pixel data items to include the identifier.

13. A system according to claim 1, wherein at least one of:
a) the monitor is arranged to monitor content of the display screens and to determine a state of the user transaction or interaction process without interfering with operation of the application;
b) the monitor comprises, or forms part of, a separate application installed on the user terminal separate from the ATM application.

14. A system according to claim 1, wherein the monitor is configured to monitor the display data by issuing an API call to at least one of:
a) a control program for the display device;
b) a driver for the display device;
c) an operating system of the user terminal.

15. A system according to claim 1, wherein the monitor comprises at least one of: a separate application; an application module; an API.

16. A system according to claim 1, wherein the system further comprises a renderer for rendering the display data for output by the display device, and the monitoring of the display data by the monitor comprises monitoring the rendered display data.

17. A method of monitoring an automated teller machine (ATM) user terminal, the method comprising:
controlling a user transaction or interaction process of the ATM using an ATM application, and the process comprises providing display data represented by screen data files for output to a user by a display device of the ATM, wherein the display data comprises pixel data items representative of pixels representing display screens for display on the display device, and the method further comprising:
modifying, using at least one further application, a selected at least one of the screen data files stored by the data store to include for said selected at least one of the screen data files an encoded identifier, wherein the identifier is encoded on a value of at least one pixel data item represented by the at least one screen data file and identifies a display screen represented by the screen data file; and the method further comprising:
monitoring, using a monitor, during the user transaction or interaction process the display data provided to the display device and for determining from the identifier encoded on the value of said at least one pixel data item whether the display data corresponds to a predetermined display screen, wherein the further application or at least one of the further applications is configured to replace or overlay said predetermined display screen with additional or alternative content in response to the monitor determining that the display data corresponds to the predetermined display screen; and the monitoring of the display data and determining a state of the user transaction or interaction process is performed without modifying said ATM application and without interfering with operation of said ATM application.

18. A computer program product comprising at least one non-transitory computer-readable medium having computer-readable program code portions embodied therein, the computer-readable program code portions comprising:

an executable portion configured for rendering display data represented by screen data files for output by a display device of an automated teller machine (ATM), wherein, the display data comprises pixel data items representative of pixels representing display screens for display on the display device;

an executable portion configured for modifying, using at least one further application, a selected at least one of the screen data files stored by the data store to include for said selected at least one of the screen data files an encoded identifier, wherein the identifier is encoded on a value of at least one pixel data item represented by the at least one screen data file and identifies a display screen represented by the screen data file; and an executable portion configured for monitoring, using a monitor, during the user transaction or interaction process the rendered display data provided to the display device and for determining from the identifier encoded on the value of said at least one pixel data item whether the display data corresponds to a predetermined display screen, wherein an ATM application controls a user transaction or interaction process of the ATM and the monitoring of the rendered display data;

the further application or at least one of the further applications is configured to replace or overlay said predetermined display screen with additional or alternative content in response to the monitor determining that the display data corresponds to the predetermined display screen; and determining a state of the user transaction or interaction process is performed without modifying the ATM application and without interfering with operation of the ATM application.

19. A control system for an automated teller machine (ATM), comprising:

an ATM user terminal, wherein the ATM comprises:
a plurality of hardware devices;
an application layer comprising an ATM application for controlling a user transaction or interaction process of the ATM;
an application program interface (API) layer comprising an interface to a receipt printer device;
a hardware-specific platform layer comprising hardware device drivers for controlling operation of the hardware devices; and
a data store;
at least one further application, wherein the at least one further application is arranged to intercept at least one message sent from the ATM application or the API, wherein the at least one message comprises content and at least one command from the ATM application to a receipt printer device to print the content on a receipt; and
a monitor for monitoring the at least one message sent from the ATM application or the API and determining a state of a user transaction or interaction process,
wherein the further application or at least one of the further applications is configured to analyze the content to be included on the receipt to determine whether or not to amend or include any further content and amend the intercepted message or at least one of the intercepted messages to provide content that is additional or alternative to the content that is included in the at least one intercepted message and for providing the at least one amended message to the receipt printer device for printing of the additional or alternative content,
wherein the monitoring of the at least one message and the determining of a state of the user transaction or interaction process is performed without modifying said ATM application and without interfering with operation of said ATM application.

20. A method of controlling an automated teller machine (ATM) that comprises an ATM application and an application programming interface (API) comprising an interface to a receipt printer device, wherein the method comprises:

intercepting, using at least one further application, at least one message sent from the ATM application or the API, wherein the at least one message comprises content and at least one command from the ATM application to a receipt printer device to print the content on a receipt; and
monitoring, using a monitor, the at least one message sent from the ATM application or the API and determining a state of a user transaction or interaction process,
wherein the further application or at least one of the further applications is configured to analyze the content to be included on the receipt to determine whether or not to amend or include any further content and amend the intercepted message or at least one of the intercepted messages to provide content that is additional or alternative to the content that is included in the at least one intercepted message and to provide the at least one amended message to the receipt printer device, wherein the monitoring of the at least one message and the determining of a state of the user transaction or interaction process is performed without modifying said ATM application and without interfering with operation of said ATM application.

21. A computer program product comprising at least one non-transitory computer-readable medium having computer-readable program code portions embodied therein, the computer-readable program code portions comprising:

an executable portion configured for intercepting, using at least one further application, at least one message sent from an automated teller machine (ATM) application or an application programming interface (API), wherein the at least one message comprises content and at least one command from the ATM application to a receipt printer device to print the content on a receipt; and an executable portion configured for monitoring, using a monitor, the at least one message sent from the ATM application or the API and determining a state of a user transaction or interaction process, wherein the further application or at least one of the further applications is configured to analyze the content to be included on the receipt to determine whether or not to amend or include any further content and amend the intercepted message or at least one of the intercepted messages to provide content that is additional or alternative to the content that is included in the at least one intercepted message and providing the at least one amended message to the receipt printer device, wherein the monitoring of the at least one message and the determining of a state of the user transaction or interaction process is performed without modifying said ATM application and without interfering with operation of said ATM application.

\* \* \* \* \*